US010035389B2

(12) United States Patent
Luce (10) Patent No.: US 10,035,389 B2
(45) Date of Patent: Jul. 31, 2018

(54) DEVICE FOR CLAMPING A PRESSURE AND TEMPERATURE SENSOR BOX TO A VEHICLE RIM AND SUITABLE BOX

(71) Applicant: LDL Technology, Ramonville Saint Agne (FR)

(72) Inventor: Dominique Luce, Bordes de Riviere (FR)

(73) Assignee: LDL TECHNOLOGY, Ramonville Saint Agne (FR)

( * ) Notice: Subject to any disclaimer, the term of this patent is extended or adjusted under 35 U.S.C. 154(b) by 126 days.

(21) Appl. No.: 14/929,773

(22) Filed: Nov. 2, 2015

(65) Prior Publication Data
US 2016/0129738 A1    May 12, 2016

(30) Foreign Application Priority Data
Nov. 7, 2014   (FR) ..................................... 14 60817

(51) Int. Cl.
*B60C 23/04*   (2006.01)
*B60C 23/20*   (2006.01)
*G01K 1/14*    (2006.01)
*G01L 17/00*   (2006.01)

(52) U.S. Cl.
CPC .......... *B60C 23/0498* (2013.01); *B60C 23/20* (2013.01); *G01K 1/14* (2013.01); *G01L 17/00* (2013.01)

(58) Field of Classification Search
CPC ...... B60C 23/0498; B60C 23/20; G01K 1/14; G01L 17/00; G01L 19/007; G01M 17/02; G01M 17/022

USPC ................................................... 73/756, 146
See application file for complete search history.

(56) References Cited

U.S. PATENT DOCUMENTS

| 3,493,028 | A  | * | 2/1970  | Scott   | B60C 25/00  |
|           |    |   |         |         | 157/1       |
| 7,246,518 | B2 | * | 7/2007  | Ito     | B60C 23/0408|
|           |    |   |         |         | 340/442     |
| 7,278,306 | B2 | * | 10/2007 | Baum    | B60C 23/0408|
|           |    |   |         |         | 73/146      |
| 7,441,452 | B2 | * | 10/2008 | Phalak  | B60C 23/0408|
|           |    |   |         |         | 73/146      |
| 7,518,496 | B2 | * | 4/2009  | Ito     | B60C 23/0408|
|           |    |   |         |         | 152/152.1   |
| 8,789,411 | B2 | * | 7/2014  | Luce    | B60C 23/0498|
|           |    |   |         |         | 73/146      |
| 2006/0096684 | A1 | * | 5/2006 | Heuze  | B60B 21/12  |
|           |    |   |         |         | 152/381.6   |

(Continued)

*Primary Examiner* — Harshad R Patel
*Assistant Examiner* — Octavia Hollington
(74) *Attorney, Agent, or Firm* — Paul & Paul (57) ABSTRACT

A device (D), for clamping an electronic box (B) on a tyre rim (J), comprises an electronic box (B) of a pressure and/or temperature sensor, at least one flexible tie (200) making at least one loop around the rim (J) and at least one means for tensioning said flexible tie, remarkable in that said tensioning means comprises a lever (110) mounted so as to be able to pivot with respect to a plate (120) that comes into abutment on the rim (J), said lever (110) passing from a raised position to a position folded down against the plate (120), the raised position allowing mounting of the ends (210 and 220) and the folded-down position tensioning said flexible tie (200) for the purpose of fixing the box (B) to the rim.

18 Claims, 9 Drawing Sheets

(56) References Cited

U.S. PATENT DOCUMENTS

2006/0266902 A1\* 11/2006 Luce ................... B60C 23/0408
                                                     248/229.1
2012/0180924 A1\* 7/2012 Auvray ................... B60C 17/06
                                                     152/520

\* cited by examiner

000
DEVICE FOR CLAMPING A PRESSURE AND TEMPERATURE SENSOR BOX TO A VEHICLE RIM AND SUITABLE BOX

CROSS-REFERENCE TO RELATED APPLICATIONS

This application claims foreign priority benefits under 35 U.S.C § 119 of French Patent Application 1460817, filed 7 Nov. 2014, the contents of which are hereby incorporated by reference.

FIELD OF APPLICATION OF THE INVENTION

The present invention relates to the field of systems for monitoring the pressure and temperature of vehicle tyres and in particular adaptations for fixing the electronic measuring box containing the sensor to the rim in the best possible way.

DESCRIPTION OF THE PRIOR ART

One of the current clamping solutions consists of using a hoop fixing the electronic box by passing under the box or through windows provided in the latter in order to pass the strap and close it on the periphery of the rim. Such a solution has the drawback of having the sidewalls of the tyre come to be applied against the box when the tyre is mounted on and removed from the rim.

Having the box subjected to such constraints may have consequences such as:
  pulling away of the strapping,
  damage to the box,
  damage to the internal wall of the tyre during such pulling away,
  the appearance of bulges in the damaged parts,
  etc.

It has for example been found, during the mounting of a heavy truck tyre, that a sensor box fixed to the rim with a strap or hoop made from stainless steel with a flat cross section (12 by 1.2 mm) cannot undergo an axial movement parallel to the axis of the wheel of more than 40 mm. This is because this travel corresponds to the plastic deformation limit of the strap. Thus, once this movement has been reached during mounting or removal phases, the deformation of the strap means that:
  the box is no longer pressed against the rim and turns freely or, more usually,
  the strap breaks.

Such a movement is quite possible because the central part of the rim frequently reaches 80 mm.

Although the technical problems cited above are not recorded therein, this configuration is found in the document US 2004/0118195, which describes an appliance for monitoring the parameters of a tyre mounted on a vehicle wheel comprising a sensor configured for installation inside the tyre. The sensor is fixed to the rim of the wheel in order to avoid its being exposed to the liquid present in said tyre. According to one embodiment, the sensor is fixed to the wheel by means of two straps or hoops that extend around a circumferential surface of the rim and are associated with a base coupled to said sensor. This is because the fact that the sensor or the box containing the sensor is associated with a base increases the height of the assembly and therefore of the obstacle that it constitutes during mounting or removal phases. In addition, the volumes of the base and of the box assembled together adopt a concave peripheral form that becomes an area holding the tyre bead, a holding that will result in the rupture either of the connection between the base and the box or of the hoop or hoops as described above. The use of hoops also has not only the drawback of not constituting the strongest solution but also not being able to adapt to conical rim profiles. This is because, by definition, a band has the same diameter on its two edges, therefore not enabling it to be adapted to a variation in diameter.

There also exists the device described in the document U.S. Pat. No. 4,507,956, which proposes connecting an electronic module to a rim by means of cables that are connected to the ends of a spring. The presence of a spring makes the fixing more complex and more expensive without being able to guarantee good tension.

The various drawbacks described above led the applicant to propose the device described in the document EP 2392480, which proposed clamping to the rim an electronic box for measuring the pressure and/or temperature inside a tyre, remarkable in that it was formed by at least one cable which, making at least one turn around the rim and pressing the box on the surface of the rim, formed, through its material, the number of wires that made it up and their torsion, an elastic tie allowing an axial movement of said box on the rim, thus preventing said box from being subjected to the force of the tyre during the mounting and removal phases.

This solution, although solving the problems of the prior art, requires the tensioning of the cable carried out in this document by means of a clamp and a means for holding under tension such as a screw.

DESCRIPTION OF THE INVENTION

The applicant has carried out research aimed at optimising the cable fixing of an electronic box on a tyre rim. This research resulted in the design and production of an innovative device for clamping a pressure and temperature sensor box on a rim able to be applied not only to a clamping using a cable but also to clampings using bands of material of greater or lesser width such as straps, a tie with a polygonal cross section, etc.

Although such a device can be installed in replacement for current clamping means, its use led the applicant to change the electronic box, which may itself have adaptations dedicated to this device, an adapted box that constitutes another subject matter of the invention.

According to the invention, the device for clamping an electronic box on a tyre rim, the device comprising an electronic box of a pressure and/or temperature sensor, at least one flexible tie forming at least one loop around the rim and at least one means for tensioning said flexible tie, is remarkable in that said tensioning means comprises a lever mounted so as to be able to pivot with respect to a plate that comes into abutment on the rim, said lever passing from a raised position to a position folded down against the plate,
  said plate accepting a first end of said flexible tie,
  said lever accepting the second end of said flexible tie,
  the raised position enabling the ends to be mounted and the folded-down position tensioning said flexible tie for the purpose of fixing the box to the rim.

This feature is particularly advantageous in that it facilitates the mounting and fixing of the sensor box on a rim while avoiding the use of a clamp and a tension-maintenance screw as was previously proposed in the prior art. This is because the use of a lever will guarantee ease of installation as well as the tensioning of the flexible tie.

Maintenance of the tension also constitutes a guarantee for the holding of the lever in the folded-down position. In addition, by controlling the length of the tie with regard to the diameter of the rim, it is possible to define a tension of the flexible tie that is identical from one rim to another. This feature is particularly advantageous since this type of fixing must allow a strategy of avoidance for the box when it is subjected to the forces of the tyre cheeks during mounting operations. This because the tension of the flexible tie must allow the box not to constitute an obstacle during said operations.

The passage from a raised position to a folded-down position will constitute the reference of good fixing.

To enable the tension to be adjusted but also to allow the use of the same flexible tie for several diameters, said plate adopts the form of a rack proposing, through its plurality of teeth, a plurality of positions for accepting said first end of the flexible tie. Still for responding to the same need, the device comprises a plate extension fixed to one end of the latter in order to offer one or more additional acceptance positions for said first end in order to allow mounting over a wide range of rim diameters. Thus, depending on the diameter, it is possible to simply extend the plate by means of said extension in order to enable the box to be fixed without changing the lever, plate or tie.

There exist several solutions for using the flexible tie, which may for example be one or more loops of a strap, or one or more loops of a cable. Nevertheless, in order to combine the advantages of the use of a cable making several turns around the rim with those of a clamping device according to the invention, said flexible tie is, according to another preferred feature, formed by a cable the two ends of which join in order to form a ring that is flattened in order to form a doubled elongated tie running around the rim and having a loop at each end. A first loop cooperates with the plate and the second loop cooperates with the lever.

According to another particularly advantageous feature of the invention, said flexible tie consists of a cable the two ends of which are folded on themselves in order to form a loop at each end, a first loop cooperating with the plate and the second loop cooperating with the lever. The advantage of such a configuration is saving on at least a third of a cable length.

In order to protect it but also to facilitate the sliding of said box along the cable, said cable is a braided cable covered with plastic. Such a feature also avoids damaging the rim. According to a preferred but non-limitative embodiment, the cable is made from 316L-grade stainless steel.

According to a preferred but non-limitative embodiment, the lever and plate are produced from thermoplastic, such as a high-performance plastics material of the type derived from polyamide.

According to another particularly advantageous feature of the invention, the device is remarkable in that said box adopts a bottom surface coming into contact with the rim and a top surface preformed so as to accept said flexible tie for the purpose of holding while allowing sliding of said box on the rim along said flexible tie.

Another subject matter of the invention consists of the pressure and/or temperature sensor box being fixed inside a tyre rim by means of a flexible tie. Thus the device of the invention is remarkable in that said electronic box forms said means for tensioning the flexible tie and comprises two parts mounted so as to be able to pivot with respect to each other so as to form a plate coming into contact with the rim and a lever passing from a raised position to a position folded down against the plate, said lever accepting a first end of a flexible tie running around the rim, the second end of which is accepted by said plate. By means of an eccentric system, passage from the raised position to the folded-down position ensures that the tie is tensioned for the purpose of fixing the box to the rim.

According to another particularly advantageous feature of the invention, the components contained in the box are integrated in the plate and/or lever.

According to another particularly advantageous feature of the invention, said lever comprises all the electronic components necessary for measuring the pressure and/or temperature in the tyre.

According to another particularly advantageous feature of the invention, said plate of the box comprises all the electronic components necessary for measuring the pressure and/or temperature. Such a configuration limits the impacts transmitted to the electronic components when the system is closed.

According to another particularly advantageous feature of the invention, said lever of the box is pierced with an orifice for discharging dirt introduced between the lever and the plate.

According to another particularly advantageous feature, the applicant has designed an assembly set comprising the means for tensioning the cable, the electronic box (if the box does not constitute said tensioning means) and a set of three looped cables offering three different lengths. Such a set makes it possible to equip, by means of the device of the invention, all the range of wheel rims for trucks according to the ETRTO, TRA and JATMA standards.

The fundamental concepts of the invention having just been disclosed above in their most elementary form, other details and features will emerge more clearly from a reading of the following description and with regard to the accompanying drawings, giving by way of non-limitative examples several embodiments of a clamping device and a box according to the invention.

DESCRIPTION OF PREFERRED EMBODIMENTS

Figure 1:
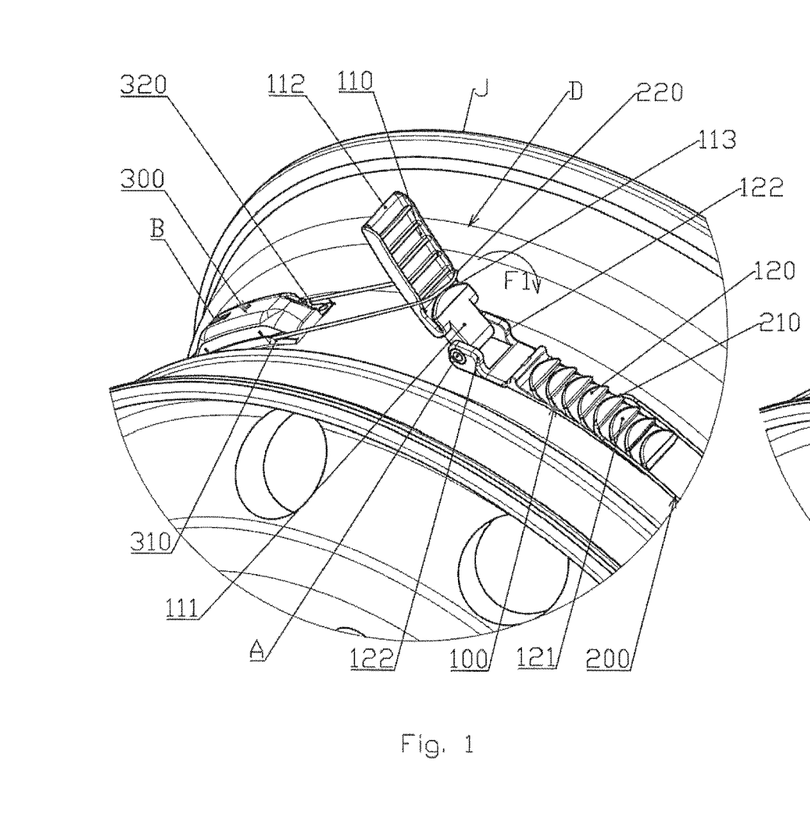
FIG. 1 is a schematic drawing of a partial view in perspective of a first embodiment of the device in the open position and disposed on the rim.
Figure 2:
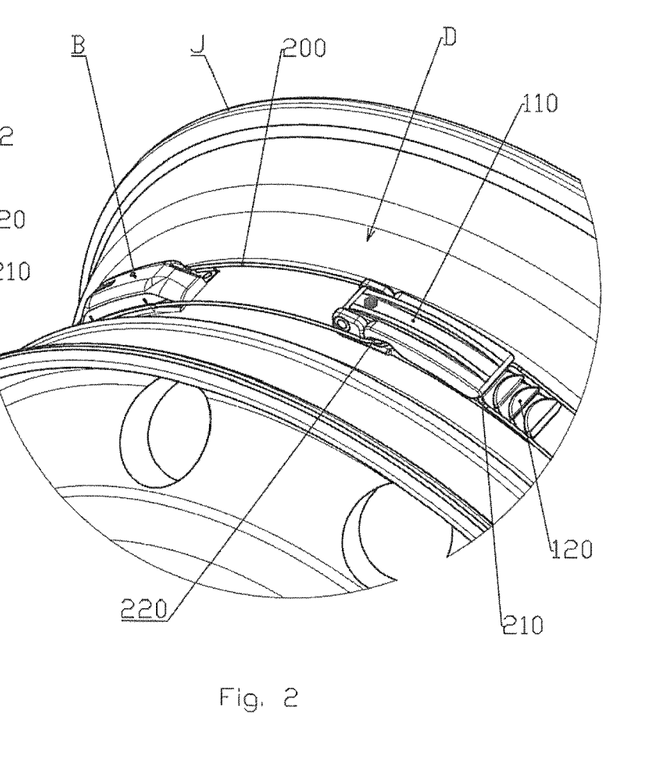
FIG. 2 is a schematic drawing of the device of FIG. 1 in the closed position.

As illustrated in the drawings of FIGS. 1 and 2, the device D for fixing the electronic box B to the rim J comprises a cable 200 associated with a module 100 for tensioning the cable 200 that presses the box B against the surface of the central groove of the rim J.

This box B comprises a plastic shell 300 that conventionally contains a pressure and/or temperature sensor.

As illustrated, the tensioning module 100 comprises a lever 110 mounted so as to be able to pivot with respect to a plate 120 that comes into abutment against the rim J.

The cable 200 comprises two ends that join to form a ring that is flattened to offer a doubled elongated tie running around the rim J and having a loop at each end, a first loop 210 cooperating with the plate 120 and a second loop 220 cooperating with the lever 110. Such a configuration makes it possible to adapt to several rim profiles, in particular those having a substantially conical shape.

This lever 110 comprises a first end 111 equipped with a rotation spindle A and a second end 112 on which the fitter will act in order to tilt the lever 110 in the direction of the arrow F1. The loop of the cable 200 engages on the lever 110 in the open position.

According to the embodiment illustrated, the shell 300 of said box B is preformed on its top face with two longitudinal lateral grooves 310 and 320 accepting a doubled cable portion 200. These grooves are preformed in order to hold the cable 200 while enabling the box to slide on the surface of the rim J along the cable (clipping). These two grooves 310 and 320 have a fixed separation and it is then important for a separation between the two portions of the doubled cable 200 to also be complied with. To do this, as illustrated, said lever 110 is preformed on its interior face in order to offer a retaining stop 113 for the second loop 220 of the cable 200, a stop taking a rounded form in order to offer a suitable radius of curvature. In addition, the box 300 is disposed at approximately thirty centimetres from the tensioning module 100 in order to allow sliding in both directions.

As illustrated, the interior face of the lever 110 is also preformed to have transverse and longitudinal ribs in order to offer a lever that is both rigid and lightweight.

The plate 120 adopts the form of a rack offering, through its plurality of teeth 121, a plurality of positions for accepting said first loop 210. According to the embodiment illustrated, the plate 120 adopts a form adapting to the surface of the rim J on which it comes into abutment through its bottom face and is preformed, at its top face:

at a first end, with two lateral projections 122 spaced apart so as to accept the first end 111 of said lever 110 and to form a bearing for the rotation shaft A of the lever 110, lateral projections as far as its second end, with teeth 121 serving as stops for holding the first loop 210 of the cable 200. As for the retention 113 preformed in the lever 110, the teeth adopt a rounded profile.

Figure 4:
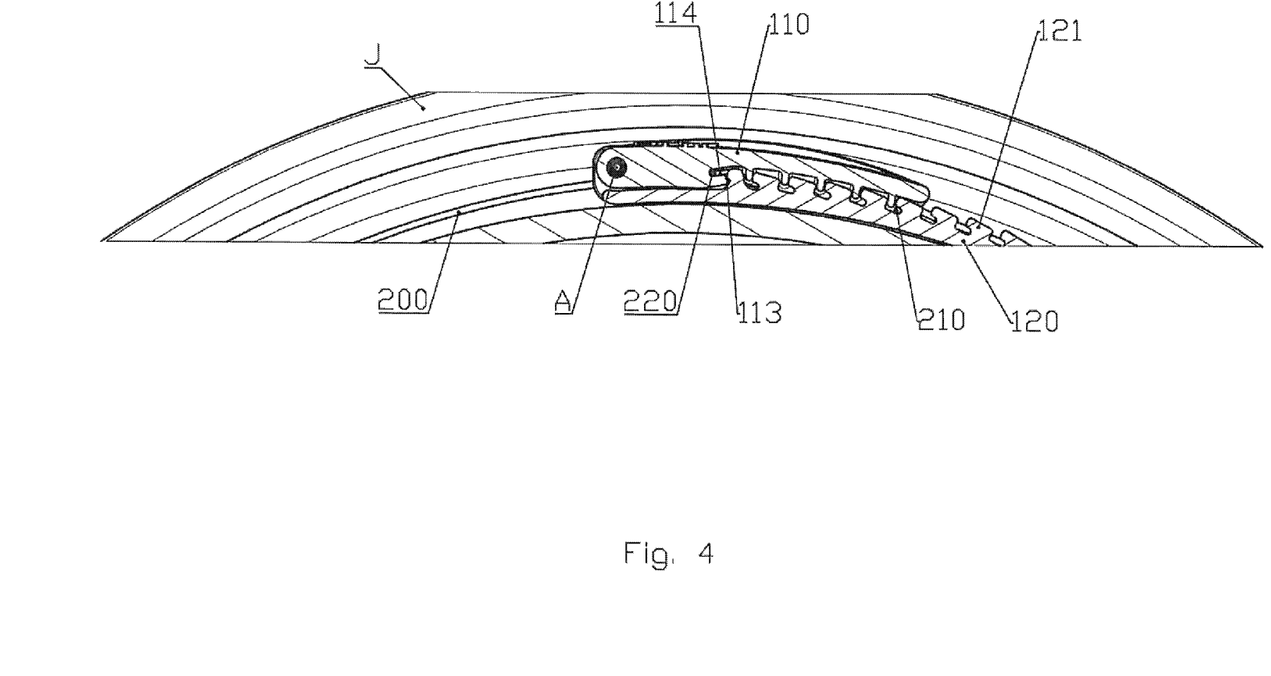
FIG. 4 is a schematic drawing of a partial side view in cross section of the device of FIG. 1 in the closed position.
Figure 5:
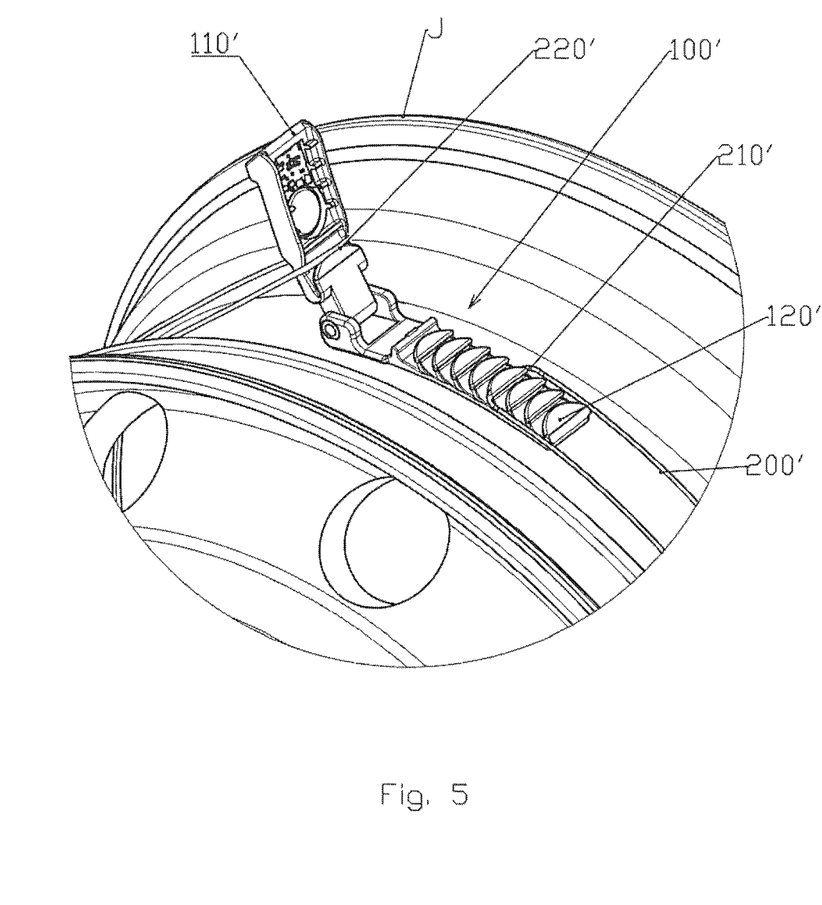
FIG. 5 is a schematic drawing of a partial view in perspective of a second embodiment of the device in the open position and disposed on the rim.
Figure 6:
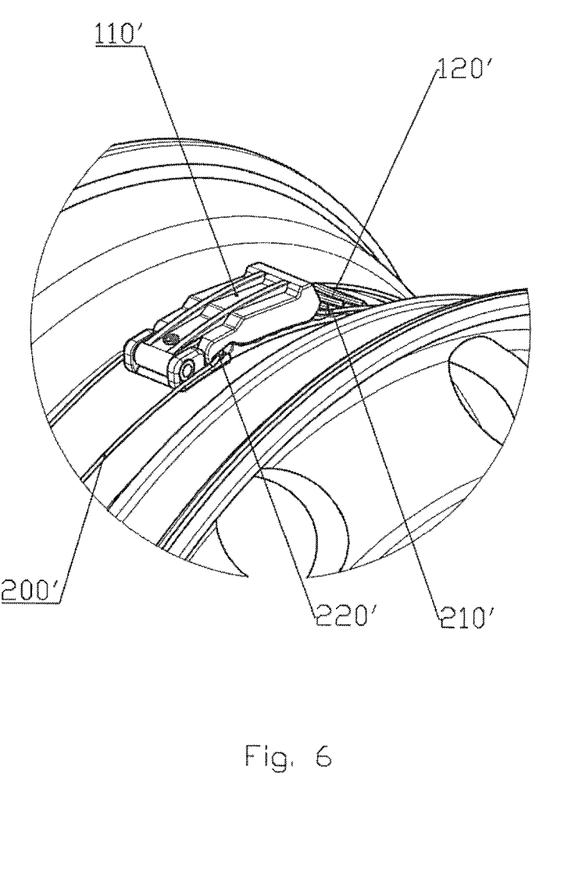
FIG. 6 is a schematic drawing of the device of FIG. 5 in the closed position.
Figure 7:
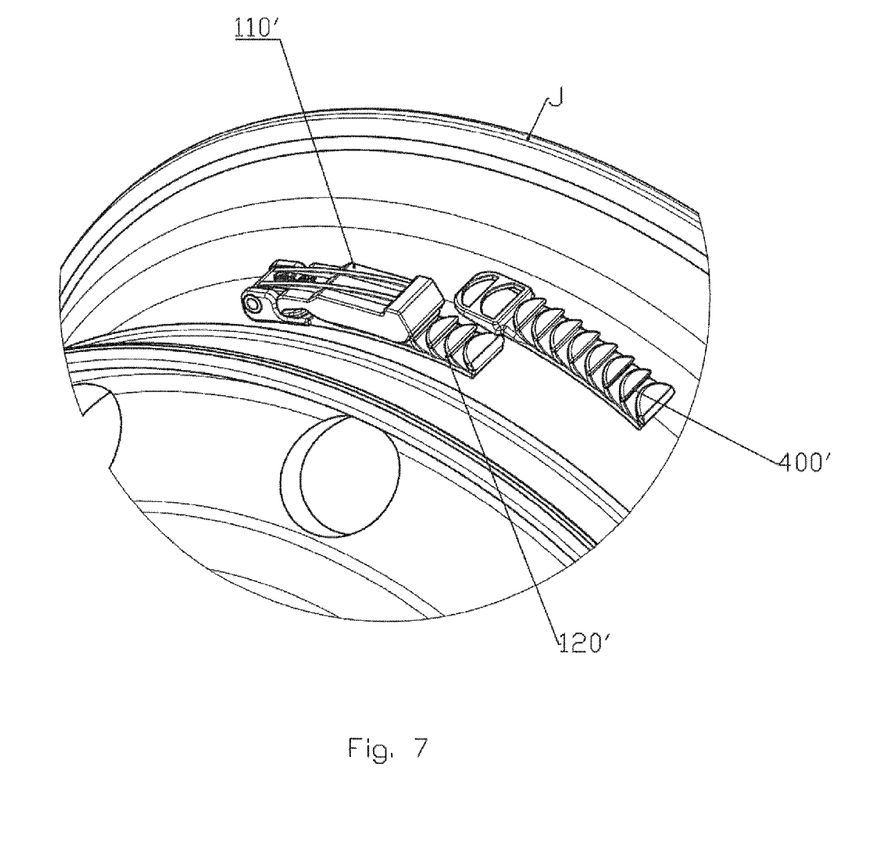
FIG. 7 is a schematic drawing of a partial view in perspective of the device of FIG. 5 accepting an extension for its plate.
Figure 8:
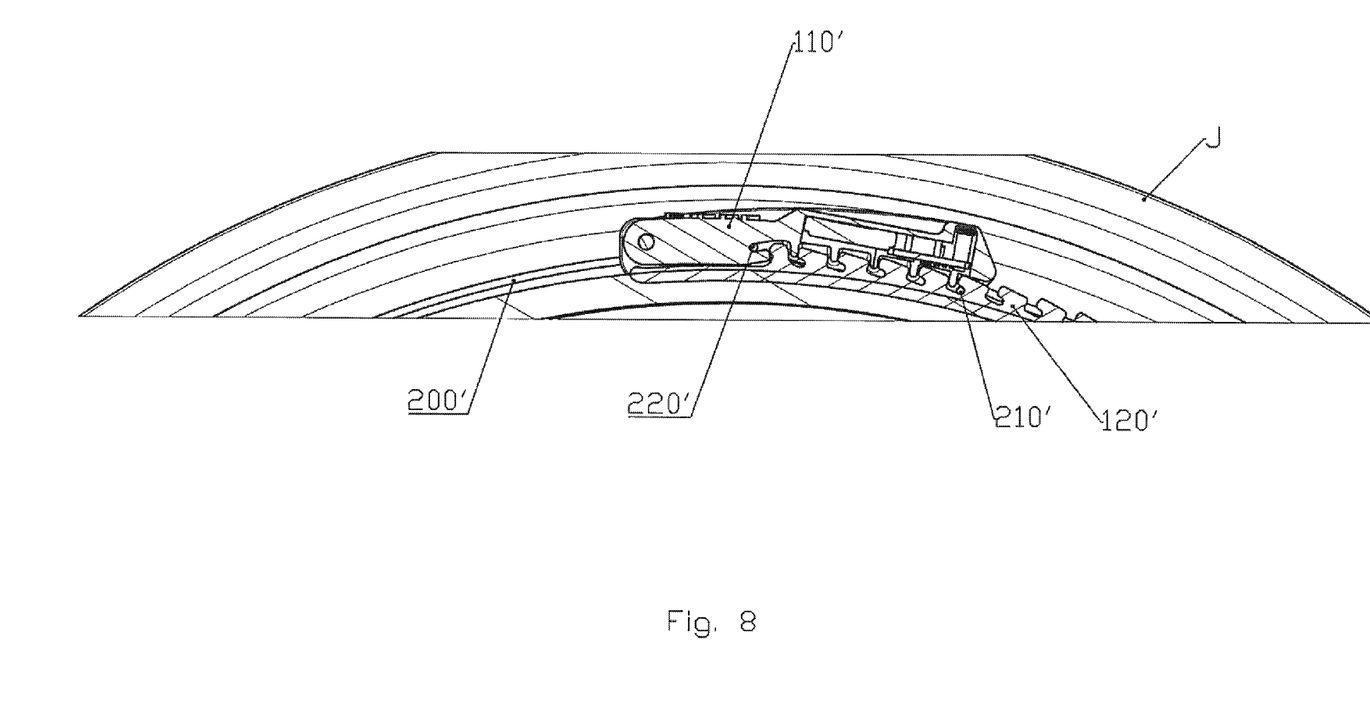
FIG. 8 is a schematic drawing of a partial side view in cross section of the device in FIG. 5 in the closed position.

Once, a first loop 210 of the cable 200 is engaged on one of the teeth 121 of the plate 120, a second loop 220 of the cable 200 is engaged on the raised lever 110, and the box B is associated through its grooves 310 and 320 with the parallel portions of the cable 200, the lever 110 is folded down in the direction of the arrow F1 in order to reach the position illustrated by the drawings in FIGS. 2 and 4.

As illustrated, the module 100 for tensioning the cable 200 then does not have a radial projection greater than that of the box B. The cable 200 is then under tension and the box B is pressed against the surface of the rim J.

The drawing in FIG. 4 specifies in the folded-down position the position of the loops 210 and 220 of the cable 200 as well as the profile of the stops 113 and 121. As illustrated, the stop 113 is associated with a top groove 114 in which the loop 220 comes to be housed during tensioning. Likewise, each tooth 121 is associated with a bottom groove 122. The presence of these grooves makes it possible to create a vertical holding surface preventing any disengagement of the cable.

As illustrated, once the lever 110 is folded down, the loop 210 is situated at a lower height with respect to the rotation spindle A, thus preventing any rotation of the lever 110 in the opposite direction.

In addition, the transverse ribs present on the internal face of the lever 110 then come to be housed and cooperate with the free gaps between the teeth 121 or fixing notches. This feature has the effect of preventing the cable coming out and guaranteeing that the cable is situated at the bottom of said gap. This is because, as the cable is not compressible, if it is not properly positioned it is impossible to tilt the lever into its final folded-down position.

Figure 3:
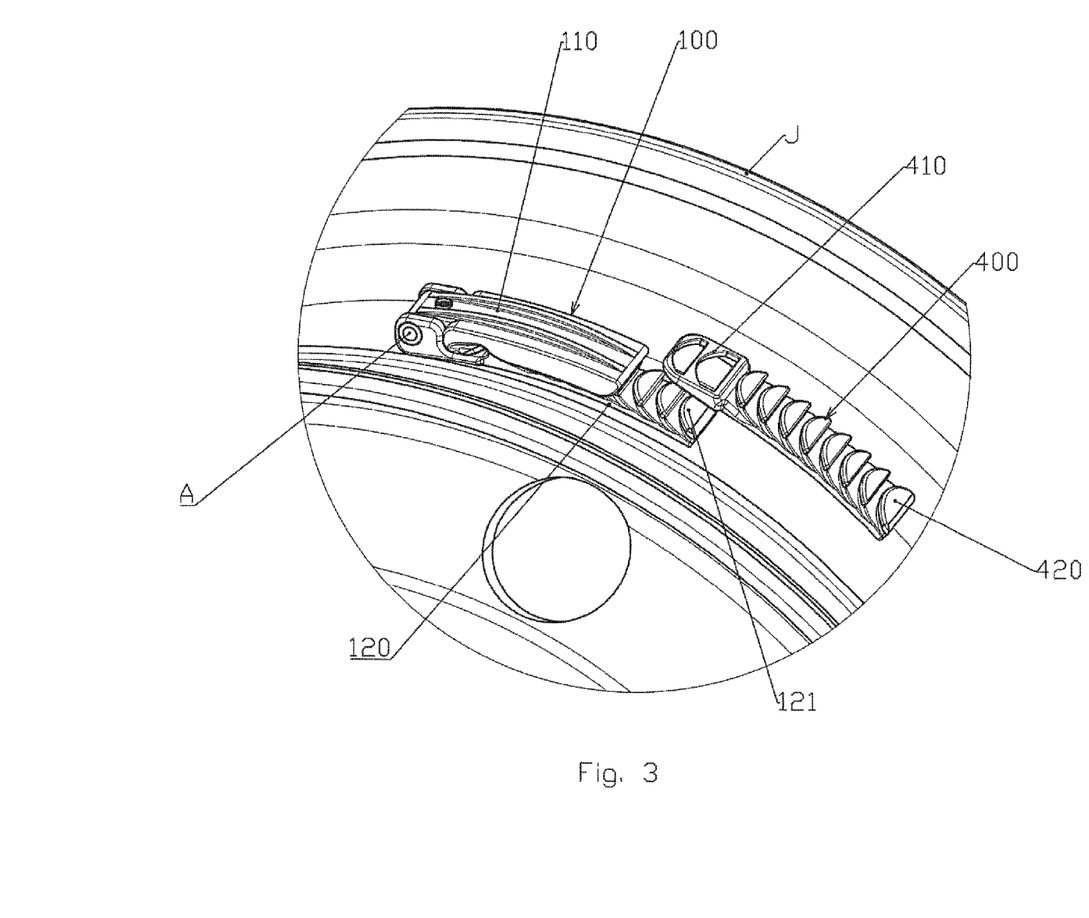
FIG. 3 is a schematic drawing of a partial view in perspective of the device of FIG. 1 accepting an extension for its plate.

As illustrated on the drawing in FIG. 3, the device D also comprises an extension 400 for the plate 120. This extension consists of an additional rack comprising at one end preforms 410 enabling it to come to be associated with one or more teeth 121 on the rack of the initial plate, and over the rest of its length a plurality of additional teeth 420. It will be understood that such an extension makes it possible to use the same cable 200 and the same tensioning module 100 on a rim with a larger diameter.

The drawings in FIGS. 5 to 8 describe another embodiment repeating the principles of the invention but where the miniaturisation efforts of the applicant enabled it to directly integrate, in the lever 110' of the tensioning module 100' of the cable 200', the components conventionally present in a separate electronic box. The box B' then consists of the tensioning module 100'.

Fixing then becomes simpler in that it is no longer necessary (in comparison with the previous embodiment) to clip the portions of the cable 200' on the box. Such a design also makes it possible to reduce the number of parts. The tensioning is also carried out as described above in that the lever 110' associated with a loop 220' pivots in order to fold down against a plate 120' associated with another loop 210' of the doubled cable 200' for its tensioning of the cable 200' and therefore clamping of the box/lever 110' on the rim J.

As with the previous embodiment, an extension 400' (cf. FIG. 7) allows the use of the same box for several rim diameters.

Figure 9:
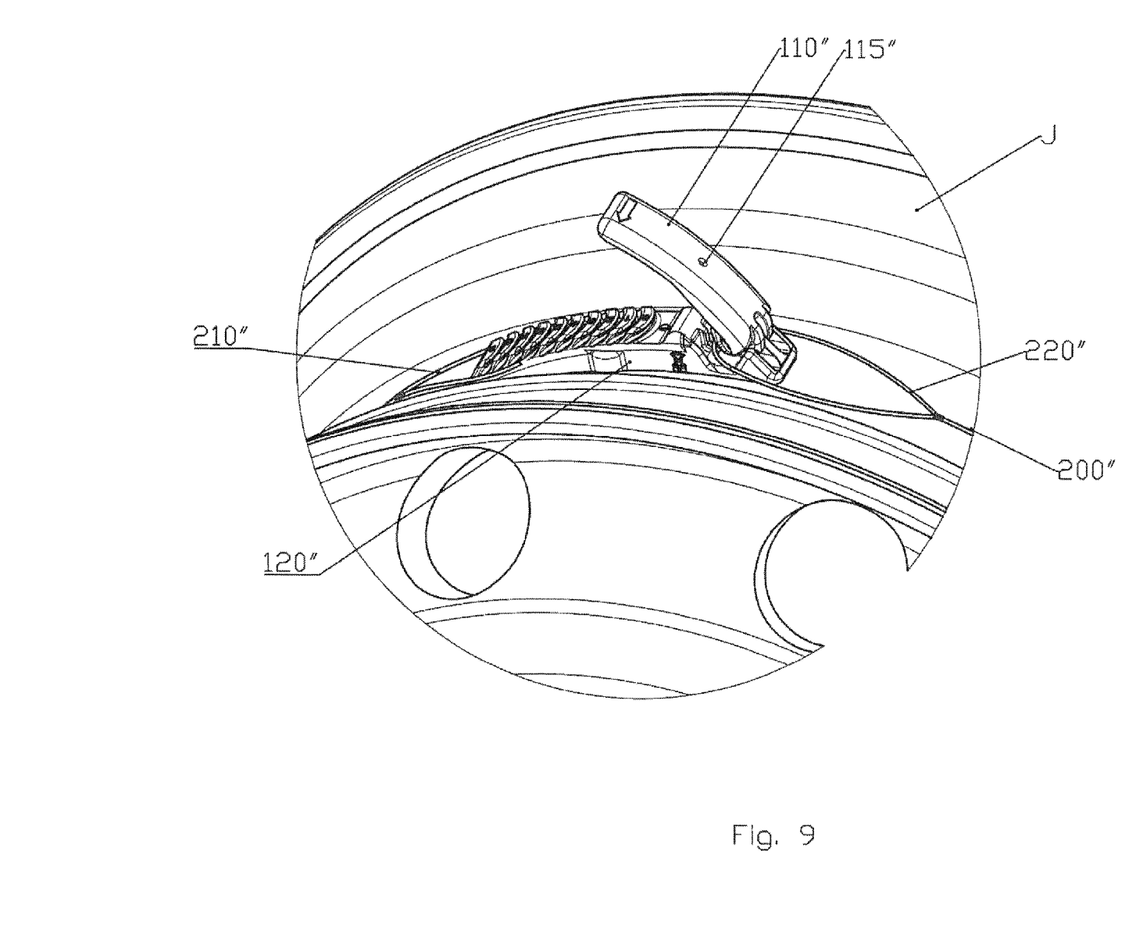
FIG. 9 is a schematic drawing of a partial view in perspective of a third embodiment of the device in the open position.
Figure 10:
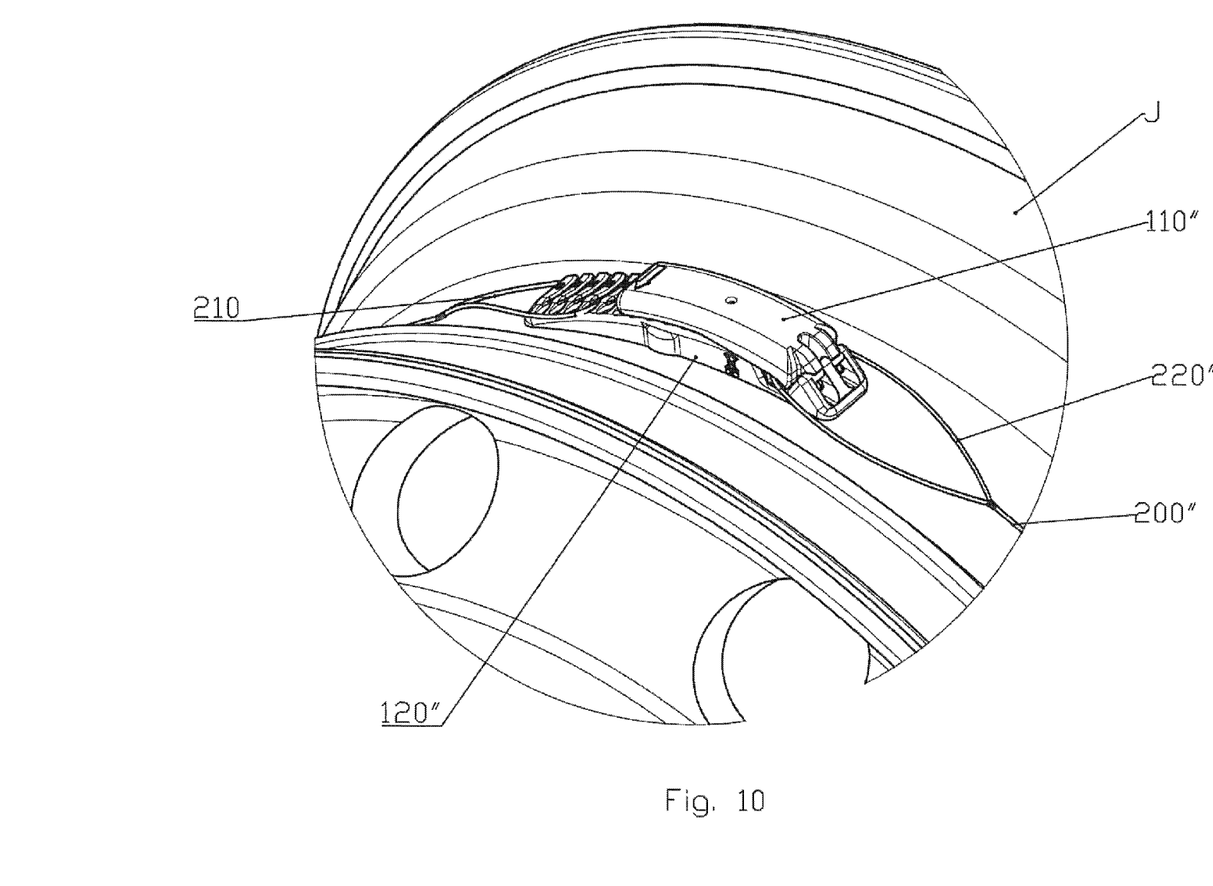
FIG. 10 is a schematic drawing of the device in FIG. 9 in the closed position.
Figure 11:
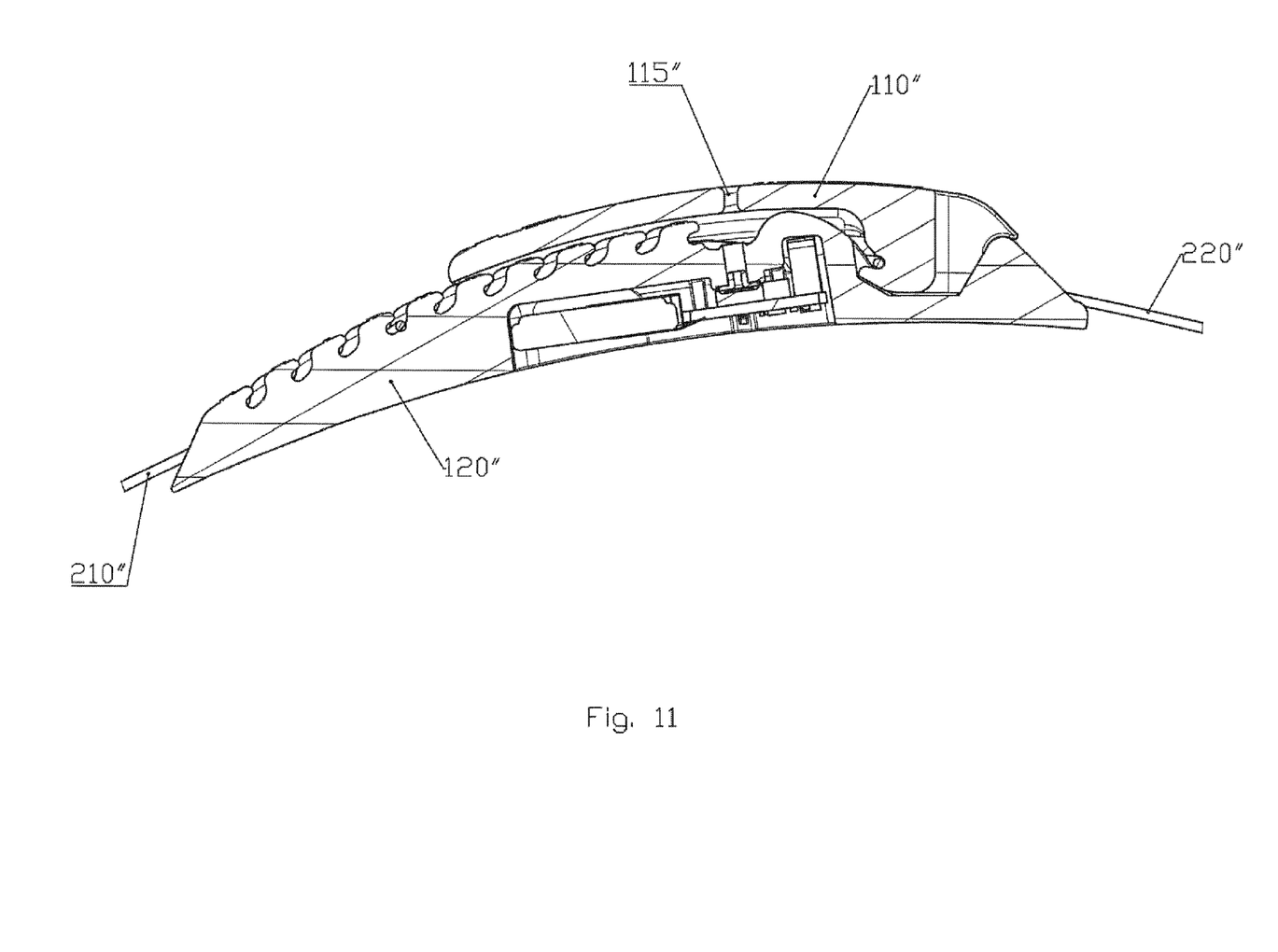
FIG. 11 is a schematic drawing of a partial side view in cross section of the device in FIG. 9 in the closed position.

The drawings in FIGS. 9 to 11 describe another embodiment repeating the principles of the invention and which differs from the previous one in that it is the plate 120" of the box that accepts all the electronic components necessary for measuring the pressure and/or temperature.

As illustrated, said lever 110" of the box is pierced with an orifice 115" for discharging dirt introduced between the lever 110" and the plate 120".

These drawings also illustrate another embodiment of the flexible tie 200", which consists here of a cable, the two ends of which are folded on themselves in order to form a loop at each end 210", 220", a first loop 210" cooperating with the plate 120" and the second loop 220" cooperating with the lever 110″. These loops 210″ and 220″ are formed by crimping the end of the cable on a portion of said cable situated further back.

It will be understood that the device and boxes that have just been described and depicted were described and depicted with a view to disclosure rather than a limitation. Naturally various arrangements, modifications and improvements can be made to the above example without departing from the scope of the invention.

The invention claimed is:

1. A device for clamping an electronic box on a tire rim, the device comprising an electronic box of a pressure or temperature sensor, a flexible tie forming a loop around the rim and a means for tensioning said flexible tie,
    characterised by the fact that said tensioning means comprises a lever mounted so as to be able to pivot with respect to a plate that comes into abutment on the rim,
    said lever passing from a raised position to a position folded down against the plate,
    said plate accepting a first end of said flexible tie,
    said lever accepting the second end of said flexible tie,
    the raised position enabling the ends to be mounted and the folded-down position tensioning said flexible tie for the purpose of fixing the box to the rim;
    characterised by the fact that said plate has a plurality of teeth and adopts the form of a rack offering, through its plurality of teeth, a plurality of positions for accepting said first end of the flexible tie.

2. A device according to claim 1, characterised by the fact that the device comprises a plate extension fixed to one end of the plate in order to offer one or more additional acceptance positions for said first end of the flexible tie in order to allow mounting on a wide range of rim diameters.

3. A device according to claim 1, characterised by the fact that said flexible tie consists of a cable, the two ends of which join to form a ring that is flattened to form a doubled elongated tie running around the rim and having a loop at each end, a first loop cooperating with the plate and the second loop cooperating with the lever.

4. A device according to claim 3, characterised by the fact that said cable is a braided cable covered with plastic.

5. A device according to claim 1, characterised by the fact that said flexible tie consists of a cable, the two ends of which are folded on themselves in order to form a loop at each end, a first loop cooperating with the plate and the second loop cooperating with the lever.

6. A device according to claim 1, characterised by the fact that said box adopts a bottom surface coming into contact with the rim and a top surface preformed so as to accept said flexible tie for holding purposes while enabling said box to slide on the rim along said flexible tie.

7. A device according to claim 1, characterised by the fact that said electronic box forms said means for tensioning the flexible tie and comprises two parts mounted so as to be able to pivot with respect to each other so as to form the plate coming into contact with the rim and the lever passing from the raised position to the position folded down against the plate, said plate accepting the first end of the flexible tie running around the rim, the second end of which is accepted by said lever, the passage from the raised position to the folded-down position tensioning the tie for the purpose of fixing the box to the rim, the electronic box containing electronic components.

8. A device according to claim 7, characterised by the fact that the components contained in the box are integrated in the plate or lever.

9. A device according to claim 7, characterised by the fact that the lever comprises all the electronic components necessary for measuring the pressure or temperature.

10. A device according to claim 7, characterised by the fact that said plate comprises all the electronic components necessary for measuring the pressure or temperature.

11. A device according to claim 7, characterised by the fact that said lever is pierced with an orifice for discharging dirt introduced between the lever and the plate.

12. A device for clamping an electronic box on a tire rim, the device comprising an electronic box of a pressure or temperature sensor, a flexible tie forming a loop around the rim and a means for tensioning said flexible tie,
    characterised by the fact that said tensioning means comprises a lever mounted so as to be able to pivot with respect to a plate that comes into abutment on the rim,
    said lever passing from a raised position to a position folded down against the plate,
    said plate accepting a first end of said flexible tie,
    said lever accepting the second end of said flexible tie,
    the raised position enabling the ends to be mounted and the folded-down position tensioning said flexible tie for the purpose of fixing the box to the rim;
    said flexible tie consisting of a cable, the two ends of which join to form a ring that is flattened to form a doubled elongated tie running around the rim and having a loop at each end, a first loop cooperating with the plate and the second loop cooperating with the lever.

13. A device according to claim 12, characterised by the fact that said cable is a braided cable covered with plastic.

14. A device according to claim 12, characterised by the fact that said plate has a plurality of teeth and adopts the form of a rack offering, through its plurality of teeth, a plurality of positions for accepting said first end of the flexible tie.

15. A device according to claim 12, characterised by the fact that the device comprises a plate extension fixed to one end of the plate in order to offer one or more additional acceptance positions for said first end of the flexible tie in order to allow mounting on a wide range of rim diameters.

16. A device according to claim 12, characterised by the fact that said box adopts a bottom surface coming into contact with the rim and a top surface preformed so as to accept said flexible tie for holding purposes while enabling said box to slide on the rim along said flexible tie.

17. A device according to claim 12, characterised by the fact that said electronic box forms said means for tensioning the flexible tie and comprises two parts mounted so as to be able to pivot with respect to each other so as to form the plate coming into contact with the rim and the lever passing from the raised position to the position folded down against the plate, said plate accepting the first end of the flexible tie running around the rim, the second end of which is accepted by said lever, the passage from the raised position to the folded-down position tensioning the tie for the purpose of fixing the box to the rim, the electronic box containing electronic components.

18. A device for clamping an electronic box on a tire rim, the device comprising an electronic box of a pressure or temperature sensor, a flexible tie forming a loop around the rim and a means for tensioning said flexible tie,
    characterised by the fact that said tensioning means comprises a lever mounted so as to be able to pivot with respect to a plate that comes into abutment on the rim,
    said lever passing from a raised position to a position folded down against the plate, said plate accepting a first end of said flexible tie,
said lever accepting the second end of said flexible tie,
the raised position enabling the ends to be mounted and the folded-down position tensioning said flexible tie for the purpose of fixing the box to the rim;
characterised by the fact that said flexible tie consists of a cable, the two ends of which are folded on themselves in order to form a loop at each end, a first loop cooperating with the plate and the second loop cooperating with the lever.

* * * * *